Feb. 16, 1937. F. J. HAMMES 2,070,790
MAGNETIC INDUCTION MOTOR
Filed Nov. 19, 1932
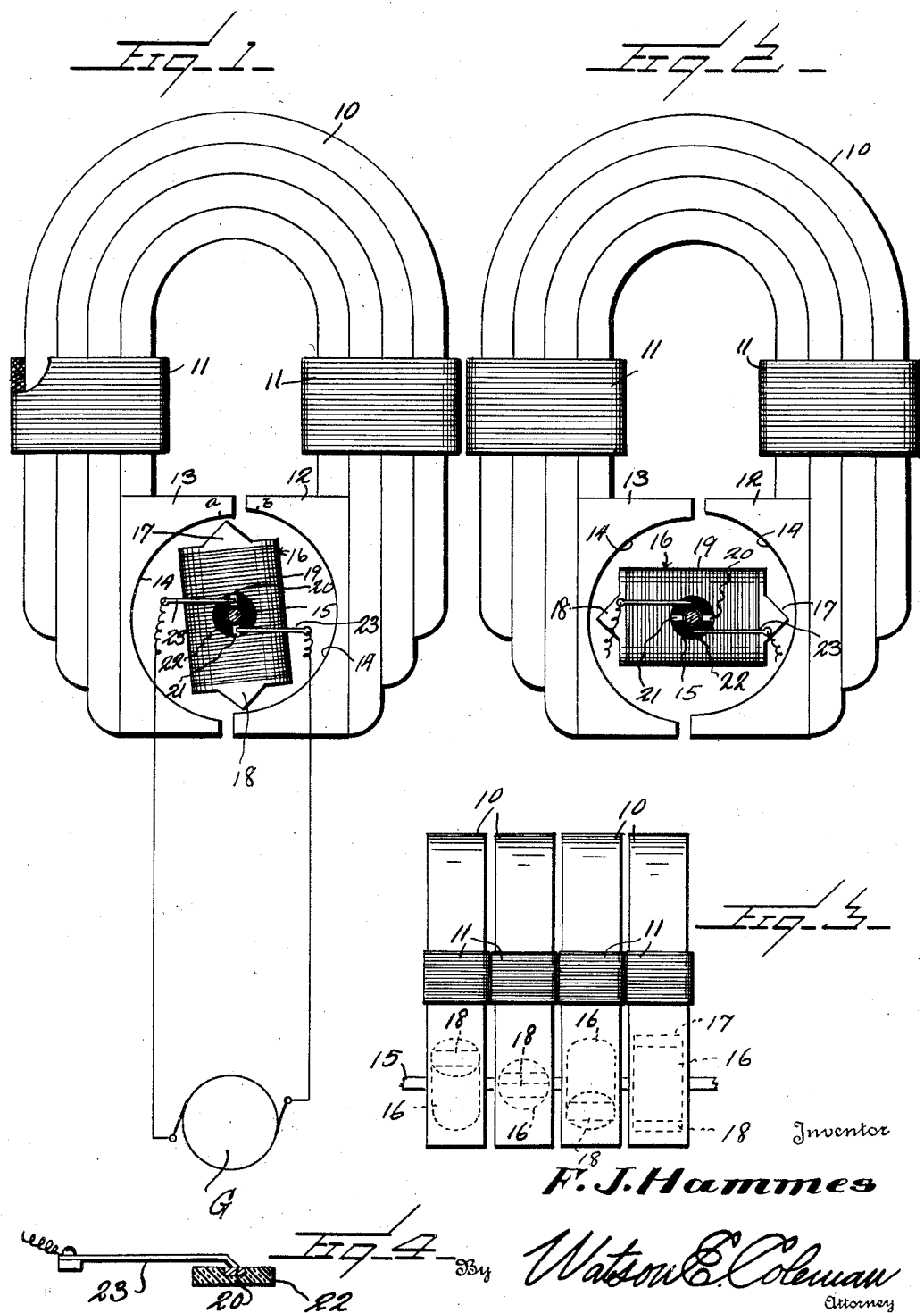

Patented Feb. 16, 1937

2,070,790

UNITED STATES PATENT OFFICE 2,070,790

MAGNETIC INDUCTION MOTOR

Frederic J. Hammes, Erlton, N. J., assignor to Magnetic Motors, Inc., a corporation of New Jersey Application November 19, 1932, Serial No. 643,474

2 Claims. (Cl. 172—36)

This invention relates to electric motors and particularly to motors in which there is provided a field magnet and an armature rotatable between the poles of the field magnet, this present application containing subject matter common to my abandoned prior application, Serial No. 410,602, filed November 29, 1929.

One of the objects of the invention is to provide a magnetic motor of this character in which the armature rotates in a magnetic field which consists primarily of two eccentric pole pieces as distinguished from the concentric or truly circular pole pieces in common use on electric motors of today.

A further object is to provide a motor of this character in which armature current is not being constantly used but which flows during but a small portion of each revolution of the armature, and a further object in this connection is to provide a motor of this character in which this armature current is used only as an auxiliary for reversing for an instant polarity of the armature poles.

A further object is to provide a motor of this character in which the magnetic attraction of the field is used to rotate the armature during the major portion of each revolution or cycle and in which eccentric or double cam-shaped pole pieces are used so that the armature will revolve from a point which is furthest from the inner surface of an eccentric field pole to a point close to it and in which the armature mass arrives at the point closest to the field or pole pieces by gradual approach whereby to cause the armature to rotate by the magnetic attraction of the fields through a much larger portion of a cycle than by any other design known to me, thus permitting much smaller inter-polar air gaps and preventing any possibility of flux-linkage between the armature and poles which might have retarding effect upon the operation of the armature.

A further object is to so construct the armature and its electrical connections that when the extremities of the armature have arrived at the points closest to the field poles, current is caused to flow through the armature winding, thereby inducing polarity of the same sign in the armature as that in the field poles they are close to, whereby the poles of the armature are immediately repelled by one field pole and immediately attracted by the inductive influence of the next field pole which is in very close proximity and is of the opposite sign and to provide means whereby the current at this instant is shut off and the armature is again rotated solely by the magnetic induction of the field poles.

My invention is illustrated in the accompanying drawing, wherein:—

Figure 1 is an elevation of the field magnets, the field magnet pole pieces being in section, the armature being in elevation;

Figure 2 is a like view to Figure 1 but showing the armature with the current cut off and the armature rotating under the attractive influence of the field magnet;

Figure 3 is a side elevation of a plurality of field magnets and a plurality of armatures mounted upon the same shaft;

Figure 4 is a fragmentary section of a portion of the armature, one of the segments and one of the brushes.

Referring to the drawing, 10 designates a field magnet. This may be either a permanent magnet or an electro-magnet. I have illustrated coils 11 surrounding the legs of these magnets and it is to be understood that these coils 11 are loading coils whereby the permanent magnet may be from time to time remagnetized. Each leg of the field magnet 10 is connected in any suitable manner or carries pole pieces 12 and 13. The inner faces of these pole pieces are semi-circular as at 14 but this inner surface 14 of the pole piece 13 is displaced downward with relation to the inner surface 14 of the pole piece 12 and the upper end of the pole piece 13 is disposed on a diametric line extending through the armature axis and intersecting the lower end face of the pole piece 12. Thus these two faces 14 are disposed eccentrically with relation to each other and with relation to the axis on which the armature rotates. Mounted upon a shaft 15 is the armature 16 which is of soft iron terminating in more or less pointed extremities or pole pieces 17 and 18.

The armature winding or armature coil is designated 19 and carried upon the armature are the commutator segments 20 and 21 disposed in diametrically opposite relation and illustrated as extending radially with relation to the armature axis. Coacting with these segments are the brushes 22 connected by suitable conductors to the brushes of a generator G or to any other source of electrical energy. It will be noted that both brushes bear on the commutator segments 20 and 21 at the same time but for only a very short period and that it is only during this period that the current is being supplied to the armature coil 19. This occurs as seen in Figure 1 when the armature occupies a position with its poles 17 and 18 at their point of nearest approach to the field poles 12 and 13 and the brushes bear against these commutator segments 20 and 21 only while the poles 17 and 18 are moving from the position a to the position b in Figure 1. As soon as the poles 17 and 18 have passed beyond the point b, the brushes pass off of the commutator segments 20 and 21 on to the insulation 22 and current to the armature is cut off.

It will be seen that in this motor, the magnetic attraction of the field pieces 12 and 13 is used to rotate the armature during the greater portion of each revolution. This is due to the eccentric relation of the two field pieces 12 and 13 to each other and to the axis of the armature. Assuming that the armature has passed the point b and the air gap between the pole pieces, it will be noted that the armature poles 17 and 18 are disposed at a position farthest from the respective pole pieces 12 and 13.

As a consequence, the magnetic attraction tends to draw the poles 17 and 18 of the armature into closer contiguity to the field poles 12 and 13, thus causing the armature to rotate in a clockwise direction, the poles 17 and 18 gradually approaching the field poles 12 and 13 until the poles 17 and 18 are again at the points lettered a. The armature after being rotated to carry its poles close to the fields by the magnetic attraction of the fields would, of course, stop with the poles 17 and 18 at the points a but at this instant the commutator segments come in contact with the brushes, causing an electric current to flow through the armature winding 19, thereby inducing polarity of the same sign in the opposite poles of the armature as in the poles of the field magnets that are closest to the respective armature poles. This causes the armature poles to be repelled from their most adjacent field poles and immediately attracted by the inductive influence of the other field pole which is in relatively close proximity and is of opposite sign in polarity. As soon as the poles have passed the points b and passed the air gaps, the current to the armature coil is cut off and the armature is again rotated by the magnetic induction of the fields to a point where the same process is repeated.

The current used to supply the armature needs be very weak and does not need to be of such strength as to cause a strong repulsive effect, but only of sufficient strength as will neutralize the attraction of that particular field pole which is in close proximity to the armature.

It needs be of no greater strength than this as rotation is continued then by the attraction of the next field pole which on account of the eccentric inner surface causes the rotation of the armature because it is of the opposite sign in polarity.

It will be noted that the weak current supplied to the armature coils is supplied at regular intervals but during a very small portion of the cycle.

It will be also noted that in this construction the field practically envelopes the armature except at the points where the air gaps occur and that these air gaps may be very short, thus securing a longer life for the field magnet, assuming that this is a permanent magnet.

Preferably the magnet will be of cobalt steel as cobalt steel will retain its magnetisim unchanged for a very long period of time provided it is given proper stabilizing treatment after hardening. A properly treated steel cobalt magnet shows no appreciable change during a period of six months. It is reiterated that in my motor current is used for the armature only during a very small fraction of its rotation. It is also reiterated that it takes but a relatively small amount of magnetism and, therefore, a relatively small amount of current to neutralize the attraction of a much superior magnet and cause the neutralization of the attraction of a field pole while the pole of the armature is passing the point of closest approximation to the field pole.

The phenomenon of polarity will be evidenced even in the presence of the infinitely more powerful field poles.

While I have illustrated a particular form of magnetic induction motor, which form I regard as particularly effective, I do not wish to be limited to the form stated except as defined in the appended claims.

In Figure 3 I have illustrated how a plurality of field magnets and a plurality of armatures may be used in a motor.

I claim:—

1. A magnetic induction motor including a field magnet having two opposed pole pieces, the confronting faces of the pole pieces being re-entrantly semicircular, the extremities of the pole pieces being spaced from each other by a non-conductive gap, an armature rotatably mounted between the pole pieces and having opposite poles, and an armature coil surrounding the armature, the opposing inner faces of the field pole pieces being each eccentric to the axis of the armature and the field pole pieces being diametrically offset with relation to each other, the armature being substantially enveloped by the field pole pieces, and means for passing current through the armature coil in a direction and to an extent just sufficient to neutralize the attraction of the field poles to which the armature poles are closest, such means acting to pass current through the armature coil only while the poles of the armature are passing the point of nearest approximation to the field poles.

2. A magnetic induction motor including a field magnet having two opposed pole faces, the confronting faces of which are re-entrantly semicircular, the extremities of the pole pieces being spaced from each other by a relatively narrow non-conductive gap, an armature rotatably mounted between the pole pieces and having opposite poles, and an armature coil, the inner face of each pole piece being eccentric to the axis of the armature and the field pole pieces being diametrically offset with relation to each other, the field pole pieces substantially enveloping the armature, and means for passing current through the armature coil in a direction and to an extent just sufficient to neutralize the attraction of the field poles, said means acting to pass the current through the armature coil only while the poles of the armature are passing the points of closest approximation to the field poles.

FREDERIC J. HAMMES.